US011047514B2

(12) United States Patent
Lazzari et al.

(10) Patent No.: US 11,047,514 B2
(45) Date of Patent: Jun. 29, 2021

(54) DEVICE FOR CONNECTING AT LEAST ONE PRODUCT DISCHARGE PIPE TO MEANS FOR RECEIVING SAID PRODUCT, FOR EXAMPLE FROM AN APPARATUS FOR EXTRACTING NUCLEIC ACID

(71) Applicant: BIOMÉRIEUX, Marcy-l'Etoile (FR)

(72) Inventors: Giorgio Lazzari, Viareggio (IT); Francesco Mancini, Florence (IT); Paolo Labrini, Pistoia (IT)

(73) Assignee: BIOMERIEUX, Marcy l'Etoile (FR)

( * ) Notice: Subject to any disclaimer, the term of this patent is extended or adjusted under 35 U.S.C. 154(b) by 477 days.

(21) Appl. No.: 15/755,160

(22) PCT Filed: Aug. 29, 2016

(86) PCT No.: PCT/FR2016/052136
§ 371 (c)(1),
(2) Date: Feb. 26, 2018

(87) PCT Pub. No.: WO2017/037373
PCT Pub. Date: Mar. 9, 2017

(65) Prior Publication Data
US 2018/0245723 A1 Aug. 30, 2018

(30) Foreign Application Priority Data
Sep. 4, 2015 (FR) ...................................... 1558202

(51) Int. Cl.
F16L 37/086 (2006.01)

(52) U.S. Cl.
CPC ......... F16L 37/086 (2013.01); F16L 2201/10 (2013.01)

(58) Field of Classification Search
CPC ........................... F16L 37/086; F16L 2201/10
(Continued)

(56) References Cited

U.S. PATENT DOCUMENTS 4,684,417 A * 8/1987 Grandclement ...... B29C 65/342
156/64
5,141,580 A * 8/1992 Dufour ............. B29C 66/52241
156/158

(Continued)

FOREIGN PATENT DOCUMENTS

DE 102005029061 A1 1/2007
GB 2484760 A 4/2012

OTHER PUBLICATIONS

International Search Report from parent PCT application PCT/FR2016/052146, 4 pages.

(Continued)

Primary Examiner — Matthew Troutman
Assistant Examiner — Fannie C Kee
(74) Attorney, Agent, or Firm — Oliff PLC

(57) ABSTRACT

An airtight connection device capable of receiving at least one product from at least one product discharge pipe and transmitting the product to a storage tank. The device includes a first part including at least one coupling for connecting to the product discharge pipe in an airtight manner; and a second part including a coupling for mounting the device to the storage tank in an airtight manner. The second part is coupled to the first part in an airtight manner and is capable of receiving the product from the first part and discharging the product to the storage tank. The device also includes a position sensor that can be operated during the airtight coupling to the storage tank.

10 Claims, 4 Drawing Sheets

(58) Field of Classification Search
USPC .................................................. 285/93, 317
See application file for complete search history.

(56) References Cited

U.S. PATENT DOCUMENTS

| | | | | |
|---|---|---|---|---|
| 8,539,997 | B2* | 9/2013 | Driftmeyer | B67D 7/42 |
| | | | | 137/554 |
| 2002/0170731 | A1* | 11/2002 | Garber | B67D 7/348 |
| | | | | 174/47 |
| 2007/0209716 | A1* | 9/2007 | Rankin | F16K 37/0033 |
| | | | | 137/554 |
| 2011/0133759 | A1 | 6/2011 | Chamberlin | |
| 2011/0199220 | A1* | 8/2011 | McAlister | C10J 3/20 |
| | | | | 340/605 |
| 2015/0000669 | A1* | 1/2015 | Miller | A61M 16/0816 |
| | | | | 128/205.23 |
| 2015/0150546 | A1* | 6/2015 | Goldschmidt | A61B 90/98 |
| | | | | 606/1 |

OTHER PUBLICATIONS

Written Opinion from parent PCT application PCT/FR2016/052146, 7 pages.
Written Opinion from parent PCT application PCT/FR2016/052136, Translation, 6 pages.
International Preliminary Report on Patentability (IPRP) from parent PCT application PCT/FR2016/052136, 8 pages.
International Preliminary Report on Patentability (IPRP) from parent PCT application PCT/FR2016/052136, Translation, 7 pages.

* cited by examiner

DEVICE FOR CONNECTING AT LEAST ONE PRODUCT DISCHARGE PIPE TO MEANS FOR RECEIVING SAID PRODUCT, FOR EXAMPLE FROM AN APPARATUS FOR EXTRACTING NUCLEIC ACID

CROSS-REFERENCE TO RELATED APPLICATIONS

This application is a § 371 filing of PCT application PCT/FR2016/052136 filed on Aug. 29, 2016, which claims priority from French application FR 1558202 filed on Sep. 4, 2015. The disclosures of these applications are included by reference herein in their entirety.

BACKGROUND

Technical Field

The present invention relates to the technical field of devices, including laboratory analysis equipment, such as for example those allowing for the extraction of nucleic acids, such as deoxyribonucleic acids (DNA) and/or ribonucleic acids (RNA), from biological samples.

The invention especially concerns a device for the connection of at least one product discharge pipe from such analysis apparatus with means for collecting said product.

The term product can refer both to a product or a mixture of gaseous or solid products such as for example products in powder form, or in liquid or viscous form or in the form of solids in liquid suspension. A liquid in the sense of the present invention can particularly represent a solid or semi-solid matrix, such as tissue, respiratory samples, sputum, pus or stools, suspended in a liquid.

More generally, the invention concerns a connection device that can be implemented within any device, including laboratory analysis equipment, comprising at least one product discharge pipe and means for collecting said product. The term product collection means signifies, for example, processing means that are suitable for receiving the product and processing it, or even means that are suitable for storing the product. Said collection means can be of any type that is appropriate to the nature of the discharged product and that are not limiting.

The invention also relates to analysis apparatus equipped with such a connection device, as well as to means for collecting the product discharged from such an analysis device and equipped with said connection device.

Description of the Prior Art

Known to the state of the art is a device allowing for the extraction of nucleic acids from biological samples particularly in performing operations called 'pipetting' which consist in collecting, by means of an automated pipette, on the one hand, biological samples and, on the other hand, chemical reagents.

The handled biological samples are sensitive to contamination such that it is imperative that the collection of biological and reagent samples be performed in a way that is completely airtight. It is the same for the discharge of such biological samples and reactive liquids that may be sources of contamination for subsequent analysis operations and for the device usage environment.

Specifically, the device can have several liquid discharge pipes, each pipe discharging liquids from separate automated pipetting means. For example, two discharge pipes for biological samples and/or liquid chemical reagents can be connected in an airtight manner by means of a connection device to a storage tank.

According to the state of the art, the connection device has a first part comprising airtight connection means to two discharge pipes of the apparatus, and a second part comprising airtight means for coupling to a discharged liquids storage tank.

Said first and second parts are coupled therebetween in an airtight manner and comprise additional means allowing for the discharge of liquid by means of said first and second parts, from the discharge pipe to the storage tank.

In order to make it possible to confirm a correct and airtight connection between the first and second parts of the connection device, two magnets are arranged on one of the parts and are intended to be positioned opposite two matching magnetic switches on the other part when they are coupled together in an airtight manner Thus, when the two parts are coupled together in an airtight manner, the magnets are positioned at a detection distance from the magnetic switches which close and transmit a signal indicating an airtight coupling between the first and second parts.

It was found however that, with this connection device configuration, it is possible to operate the analysis apparatus while the second part of the connection device is not connected in an airtight manner to the liquid storage tank.

As a result, the discharged liquids can flow between the storage tank and the second part. In addition to the inconvenience associated with leakage, the flow may give rise to the risk of contamination of the pipetting area, and distort subsequent analysis operations.

DESCRIPTION OF THE INVENTION

One of the aims of the invention is therefore to overcome the aforementioned disadvantages by proposing a connection device between at least one product discharge pipe, such as a liquid, a gas or a solid, from a device that makes it possible to perform analysis operations, such as pipetting operations for the extraction of nucleic acids, and means for collecting said product, which has optimal sealing and safety when in use, avoiding any risk of liquid leakage and contamination.

For this purpose, an airtight connection device has been developed comprising at least one product discharge pipe with means for collecting said product, said device comprising:

a first part comprising means for connecting to the pipe in an airtight manner;
a second part comprising means for coupling to the collection means in an airtight manner.

Said first and second parts are coupled therebetween in an airtight manner and comprise additional means allowing for the discharge of the product by means of said first and second parts, from the discharge pipe to the collection means.

According to the invention, the second part comprises a position sensor arranged in order to be actuated during the airtight coupling to the collection means.

In this way, when the connecting device is coupled in an airtight manner to the product collection means, the sensor is actuated and transmits a signal to the user in order to indicate the airtight coupling. Risks of leakage and contamination are avoided, the connection device cannot be used when coupling to the collection means is not completed in an airtight manner.

The product collection means can be of any type that is appropriate to the nature of the discharged product such as for example processing means that are suitable for collecting the product and processing it, or means that are suitable for storing said product such as a storage tank of said product.

Preferably, the actuation of the sensor causes the movement thereof to a position for the detection of the airtight coupling of the first part to the second part.

In this way, the invention makes it possible, with a single sensor, to detect both, on the one hand, the airtight coupling between the second part and the collection means and, on the other hand, the coupling between the two component parts of the connection device.

According to a particular embodiment, the second part comprises means for moving an activation member of the position sensor, against a detection member of said position sensor, and in particular towards said activation member, allowing for the movement of the activation member from a neutral position to a detection position, said moving means being actuated during the airtight coupling to the collection means.

Advantageously, the detection member is arranged on the first part such that when the second part is coupled in an airtight manner to the collection means, the movement means moves the activation member to the detection position, at the detection distance of said member.

According to a particular embodiment, the movement means are in the form of a leaf spring arranged at the means for coupling to the collection means, the activation member is mounted on the blade of said spring, and the spring is arranged in such a way as to be compressed during the airtight coupling to the collection means such as to move the activation member to the detection position.

The leaf spring has, for example, an annular portion with a blade extending, internally and from an edge, preferably diametrically, in such a way as to have a free end located within an area defined by the annular portion of the spring, said free end receiving the activation member.

In this configuration, the second part comprises, for example, a movable portion arranged at the means for coupling to the collection means and intended to be moved relatively in the direction of the spring during the airtight coupling to said collection means. The movable portion comprises an annular shoulder wherein the peripheral edge opposite the spring is chamfered and is suitable, during the movement of the movable portion, for butting against the annular portion of the leaf spring in order to apply to said spring a concave deformation, in abutment against an annular bearing portion arranged on the second part and having the same slope as the chamfered shoulder, in such a way that the blade of the spring moves the activating member to the detection position.

The activation and detection members of the sensor can be of any type without going beyond the scope of the invention. For example, the activation member has the form of at least one magnet. In this particular configuration, the detection member may have the form of at least one magnetic switch.

The invention also aims to protect apparatus, preferably analytical laboratory equipment, such as for example a device allowing for the extraction of nucleic acids, by discharging a product in an airtight manner into the collection means of said product by means of a discharge pipe.

According to the invention, the apparatus comprises a connection device as described above, the first part being connected in an airtight manner to the product discharge pipe.

In the same way, the invention aims to protect the apparatus, preferentially laboratory analysis equipment, comprising a connection device and discharged product collection means. According to the invention, the connection is consistent with that described above, wherein the first part is connected in an airtight manner to the product discharge pipe and wherein the second part is coupled in an airtight manner to the collection means.

Finally, the invention also aims to protect the airtight collection means of a product intended to be discharged by at least one pipe of an apparatus, preferably laboratory analysis equipment. According to the invention, said collection means are coupled in an airtight manner to the second part of a connection device according to that described above.

According to particular embodiments, the discharged product collection means are for example in the form of processing means, such as a processing unit suitable for processing the discharged and collected product, or else for example in the form of storage means, such as a storage tank defining a closed airtight volume and comprising for example a threaded neck.

BRIEF DESCRIPTION OF FIGURES

Further characteristics and advantages of the invention will become apparent from the description provided below, which is for reference only and is in no way restrictive, with reference to the accompanying figures, wherein.

DETAILED DISCLOSURE OF THE INVENTION

The invention especially concerns a device for the connection of at least one product discharge pipe to means for collecting said product.

The connection device can be implemented in all applications wherein it is necessary to ensure an airtight connection between at least one product discharge pipe and collection means.

The invention is described below in relation to an analysis apparatus, such as an apparatus for extracting nucleic acids from biological samples and chemical reagents that discharges a product in liquid form, into collection means in the form of a storage tank defining a closed airtight volume and comprising a threaded neck.

The apparatus, which is well known to the state of the art, makes it possible to perform, in a regular and repetitive manner, biological sample and chemical reagent pipetting operations in order to extract the DNA and/or the RNA content within the biological samples. During these pipetting operations, the liquid biological and reagent samples are discharged by means of two discharge pipes into the storage tank, each pipe discharging the liquids from separate pipetting means.

The discharge of these liquids must by necessity be performed in an airtight manner in order to avoid any contamination of the subsequent extraction and analysis operations performed by the apparatus.

For this purpose, the apparatus comprises a connection device connecting, in an airtight manner, the two pipes to the storage tank for the discharge as such of liquids.

Referring to FIGS. 1 to 6, the connection device comprises a first part (1) intended to be connected in an airtight manner to the discharge pipes (T), and a second part (2) intended, however, to be coupled in an airtight manner to the storage tank (not shown). The two parts (1, 2) are coupled in an airtight manner, in particular by clip-fastening.

The first part (1) and second part (2) further comprise additional means allowing for the discharge of liquid through said first and second parts, from the discharge pipes (T) into the storage tank.

Figure 3:
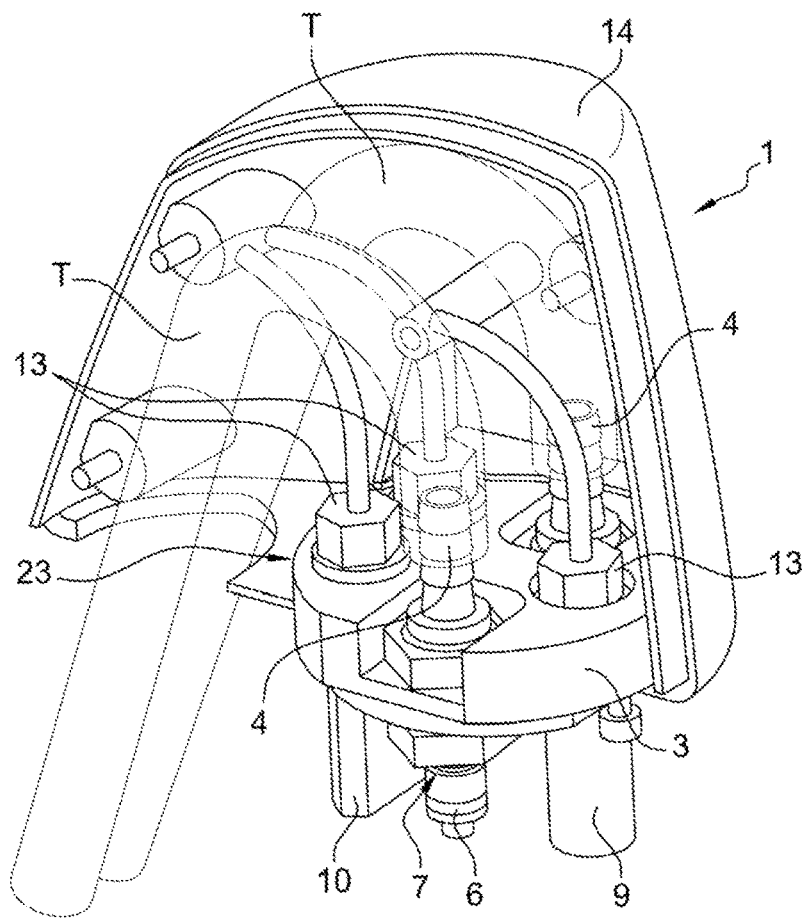
FIG. 3 is a cut-away schematic perspective view illustrating a first part of a connection device according to the invention, connected in an airtight manner to two discharge pipes of analysis apparatus for example.

Referring to FIG. 3, the first part (1) comprises a base (3) of a generally cylindrical shape traversed longitudinally by two male coupling fittings (4) intended to be inserted, on the one hand, into the two pipes (T) for discharging liquid from the apparatus and, on the other hand, into two complementary female connection fittings (5) that the second part (2) has, intended to be in communication with the interior of the storage tank.

Said male coupling fittings (4) each comprise an O-ring (6) for sealing and an annular upper groove (7) for clip-fastening to locking means (8) of the coupling arranged on the female fittings (5) and suitable for engaging within said grooves (7) for locking as such. The first part (1) and the second part (2) are thus coupled to one another in an airtight manner. Said male (4) and female (5) coupling fittings allow for the movement in an airtight manner of liquid products coming from the discharge pipes (T) and the discharge thereof through said first and second parts to the storage tank.

The base (3) further comprises a guide finger (9) and a flat keyway (10) both protruding from a bottom wall intended to be opposite the second part (2).

Figure 1:
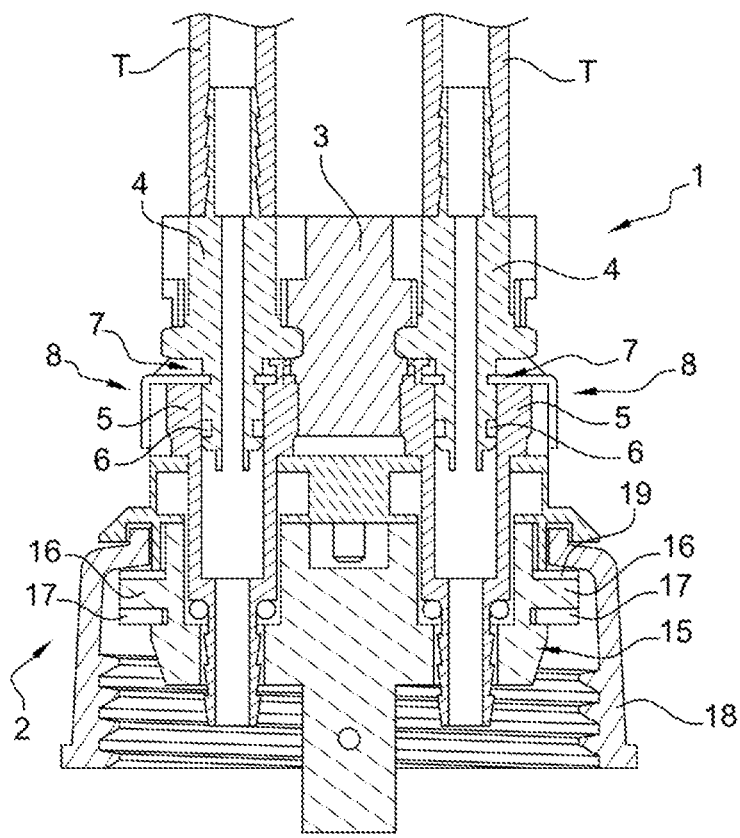
FIG. 1 is a schematic longitudinal cross-section view showing the first and second parts of the device according to the invention coupled therebetween in an airtight manner, the sectional plane passing through the male and female connecting pipes of said device.
Figure 2:
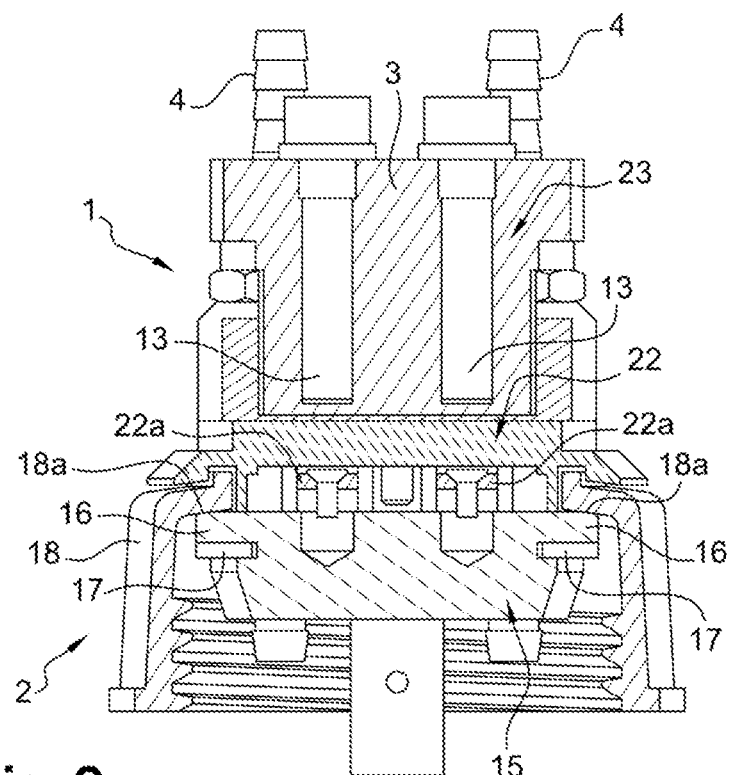
FIG. 2 is a schematic longitudinal section view similar to that of FIG. 1, the sectional plane passing through the position sensor magnets, which are shown in the detection position.

Referring to FIGS. 1 and 2, the coupling between the first part (1) and the second part (2) is therefore made by inserting the two male coupling fittings (4) into the two female coupling fittings (5), and by inserting the finger guide (9) into a complementary cylindrical recess (11) arranged on the second part (2). The flat keyway (10) projecting from the first part (1) cooperates with a complementary flat part (12) of the second part (2). The guide finger (9) and keyway (10) allow for optimal coupling, without risk of error, and in a guided manner in order to avoid damage to the O-rings (6) of the male coupling fittings (4).

Three magnetic switches (13), well known to the state of the art, are positioned on an upper wall of the base (3). Said magnetic switches (13) are intended to close when a magnetic member is approached, at a detection distance, on the other side of the base (3), at the bottom wall. The electrical connection of the magnetic switches (13) is traditional and well known to the state of the art such that it will not be described.

The base (3) of the first part (1) comprises a protective cover (14) covering the discharge pipe (T) and the connection thereof to the male coupling fittings (4).

Figure 4:
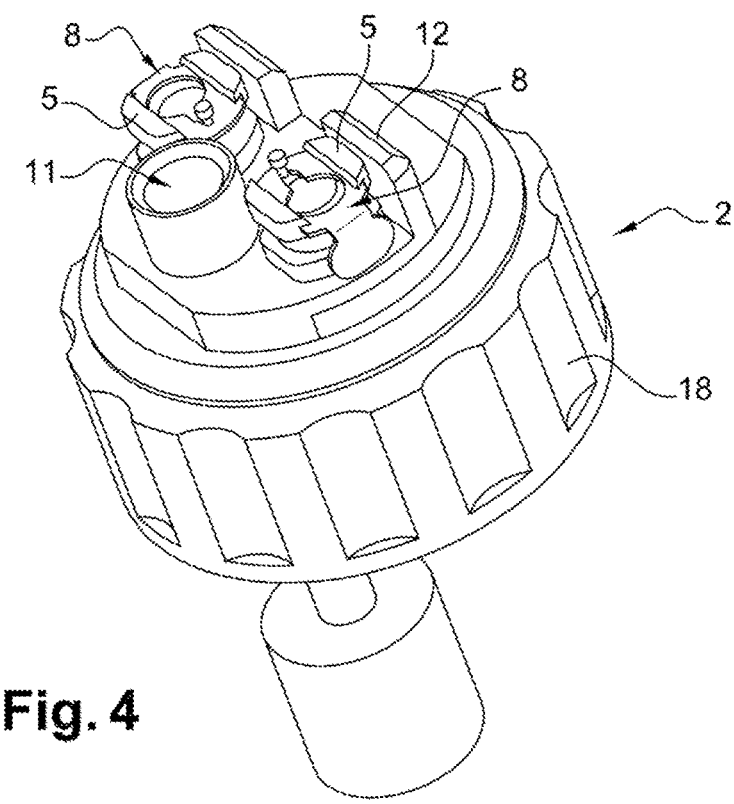
FIG. 4 is a schematic perspective view illustrating a second part of the connection device according to the invention, intended to be coupled in an airtight manner to product collection means such as a storage tank.
Figure 5:
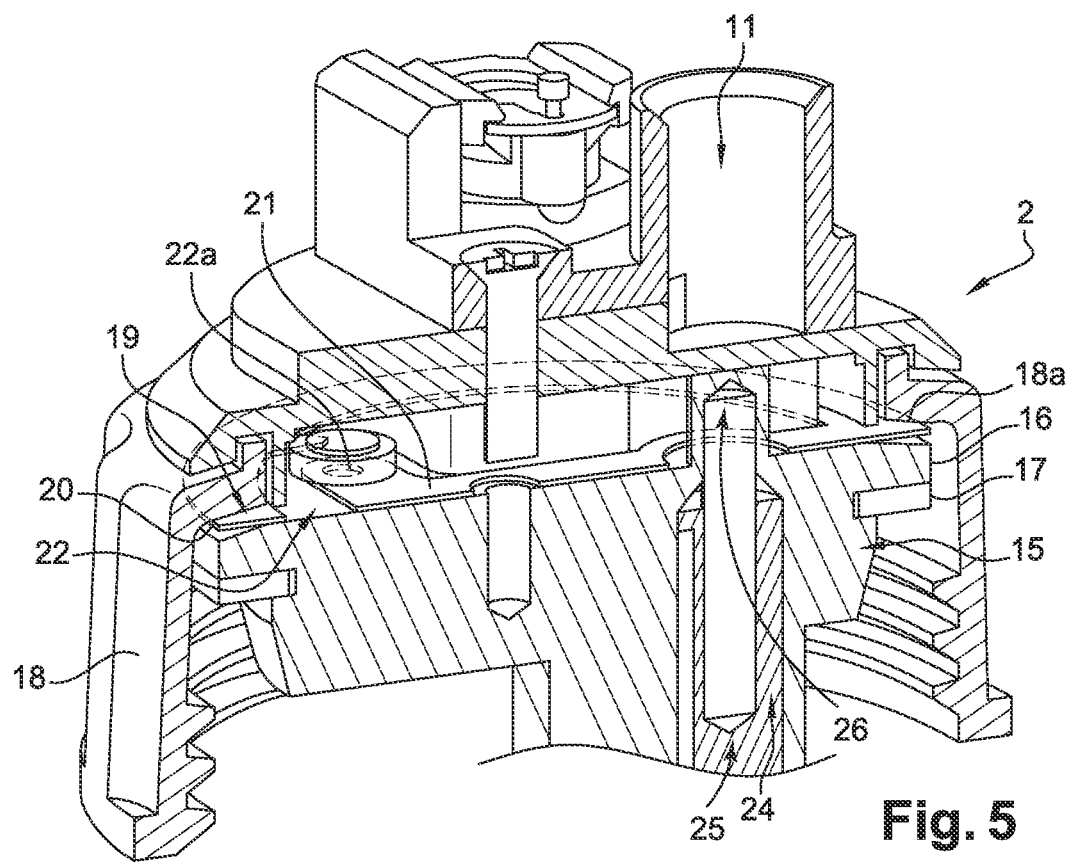
FIG. 5 is a schematic view similar to that of FIG. 4, the second part being shown in longitudinal section view.
Figure 6:
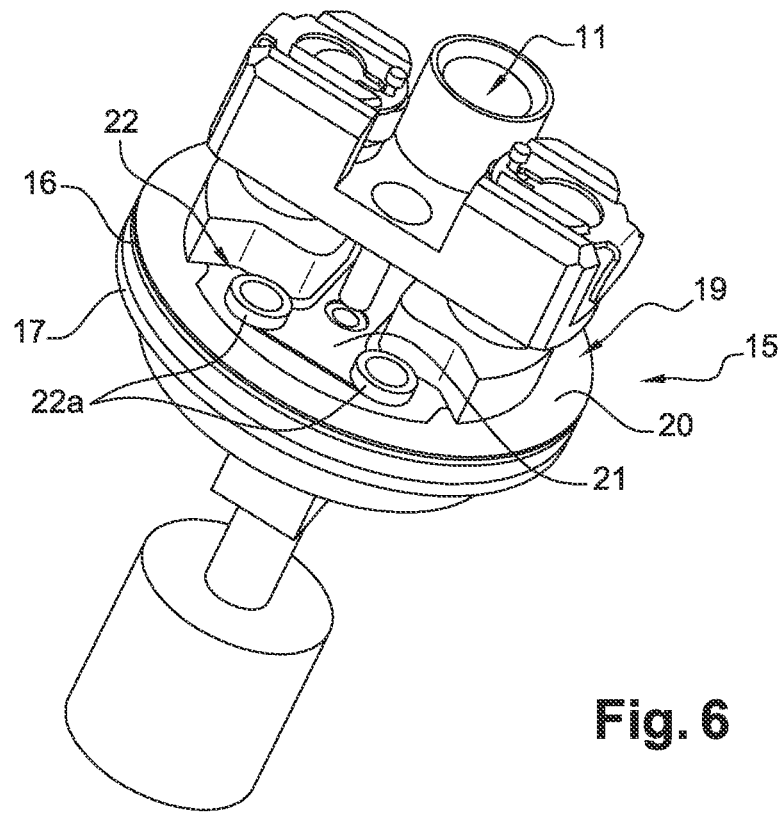
FIG. 6 is a schematic view similar to that of FIG. 4, said second part being shown without the tightening ring or cover thereof.

Referring to FIGS. 4 to 6, the second part (2) is, on the other hand, in the form of a cap for closing the threaded neck of the storage tank. For this purpose, the second part (2) comprises a sealing portion (15) of a generally cylindrical shape, intended to be inserted into the neck of the tank to seal it. Said sealing portion (15) comprises an upper annular shoulder (16) with a lower part fitted with a sealing ring (17). Said sealing ring (17) is intended to be in contact, after coupling, with the annular upper edge of the neck of the tank.

Referring to FIGS. 4 and 5, a tightening ring (18) is arranged around the sealing portion (15) and is intended to be screwed around the neck of the storage tank in order to ensure an airtight coupling, in combination with the annular sealing ring (17) of the sealing portion (15).

Referring to FIGS. 5 and 6, a leaf spring (19) is arranged between an upper portion (18a) of the tightening ring and the annular shoulder (16) of the sealing portion (15).

Figure 7:
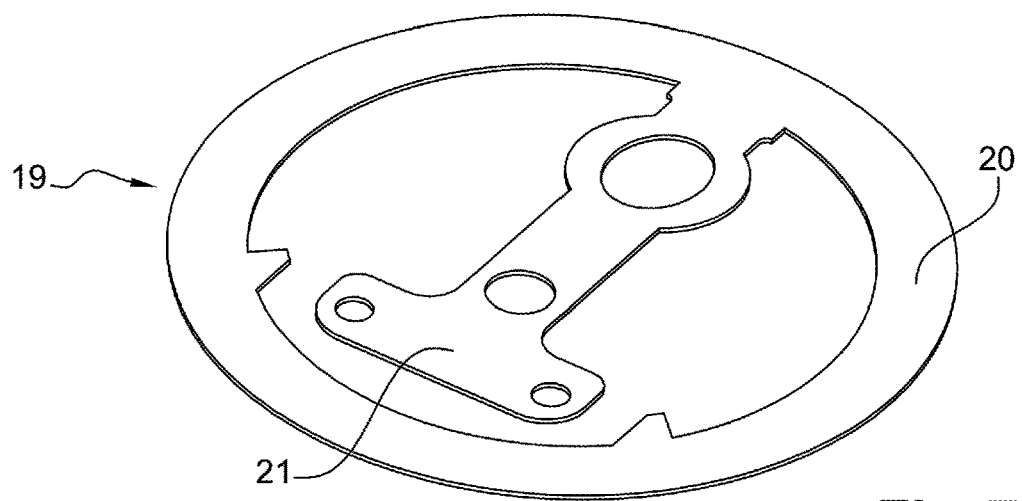
FIG. 7 is a schematic perspective view showing a leaf spring implemented within the second part of the device according to the invention.

Referring to FIG. 7, the leaf spring (19) has an annular portion (20) with a blade (21) extending, internally and from an edge, preferably diametrically, in such a way as to have a free end located within an area defined by the annular portion (20) of the spring.

Referring to figures S and 9, the annular part (20) of the leaf spring (19) is clamped between an upper portion (1Sa) of the tightening ring (1S) and the annular shoulder (16) of the sealing portion (15). The peripheral edge of the shoulder (16), opposite the spring, is chamfered. The upper portion (18a) of the tightening ring (IS) has substantially the same slope as the chamfered shoulder (16). In this way, a relative movement of the sealing portion (15) in the direction of the tightening ring (1S) makes it possible to compress the annular part (20) of the leaf spring (19) in order to force said spring (19) to deform itself along the inclined slopes and to assume a concave shape in such a way as to raise the blade (21). This relative movement between the tightening ring (1S) and the sealing portion (15) is obtained when said tightening ring (IS) is screwed onto the neck of the storage tank that is supported on the chamfered shoulder (16). The result is that when the coupling between the storage tank and the second part (2) is performed in an airtight manner, the blade (21) of the leaf spring (19) is moved in the direction of the first part (1).

Figure 8:
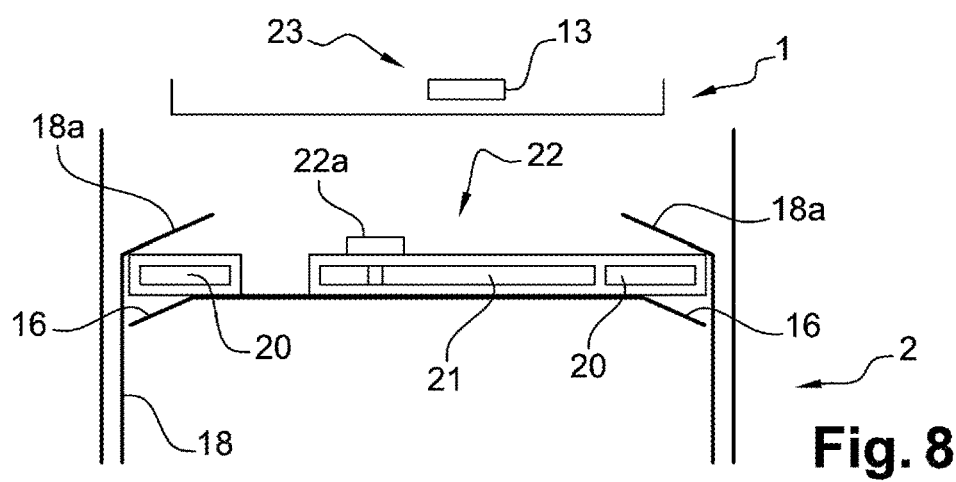
FIG. 8 is a schematic view showing the positioning of the spring when the second part of the device according to the invention is not coupled to the product collection means or when the coupling has not been completed entirely and in an airtight manner, the activation member of the sensor being in the neutral position.
Figure 9:
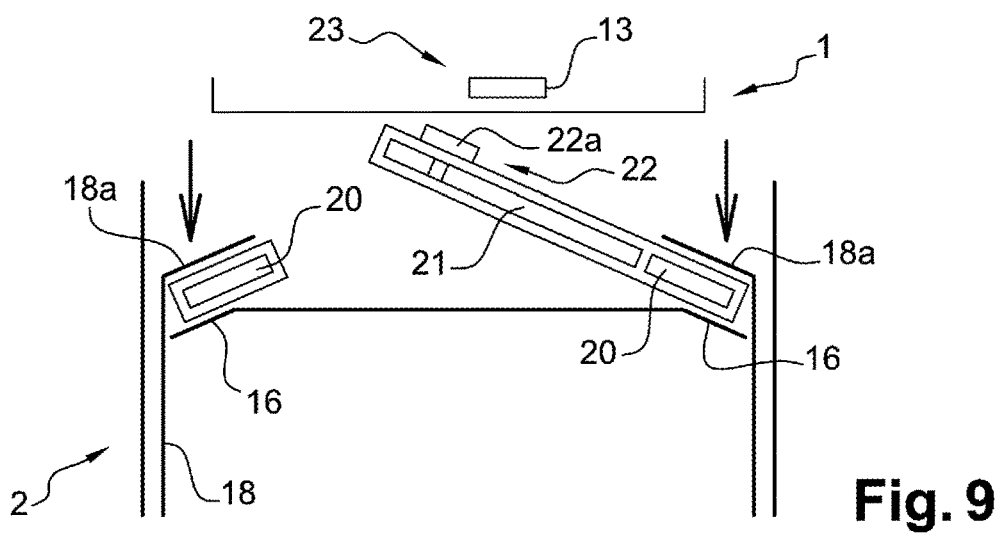
FIG. 9 is a schematic view similar to that of FIG. 8, showing the positioning of the spring when the second part of the device according to the invention is coupled in an airtight manner to the collection means, the activation member of the sensor being in the detection position.

However, the blade (21) of the leaf spring (19) receives an activation member (22) of a position sensor. Said activation member (22) is for example in the form of two magnets (22a) which are movable from a neutral position (FIG. 8) to a detection position (FIGS. 2 and 9) when the coupling is performed in an airtight manner between the tank and the connection device, corresponding to the raising of the blade (21) of the leaf spring (19).

The activation member (22) can be moved, particularly in the direction of a detection member (23) which is particularly comprised of two of the three magnetic switches (13) arranged on the first part (1) of the connection device. The raising of the blade (21) makes it possible to position the two magnets (22a) opposite and at a detection distance of both magnetic switches (13) that close in order to indicate to a user an airtight coupling between the storage tank and the connection device.

The invention thus provides a connection device comprising a position sensor with an activation member (22) arranged on the second part (2) and movable into a detection position, only when the device is coupled in an airtight manner to the storage tank, in the direction and within the detection field of the detection member (23) which is arranged on the first part (1). In this way, the detection can be performed only if the first part (1) and the second part (2) are coupled therebetween in an airtight manner. In other words, with a single sensor the invention allows for, on the one hand, the airtight coupling between the second part (2) and the collection means and, on the other hand, the coupling between the two parts (1, 2) that constitute the connection device.

Given that the device is able to notify the user when it is coupled in an airtight manner, the connection device thus ensures optimal safety in use, avoiding the risk of leakage and contamination. In an advantageous manner, the magnetic switches (13) of the detection member (23) govern the apparatus in such a manner that it cannot function as long as said magnetic switches (13) are not closed, signifying that the couplings are not airtight.

To further guarantee user safety, the connection device incorporates an overflow sensor that is suitable for signaling to the user that the volume of liquid contained within the storage tank is greater than a given threshold. To this end, and with reference to FIG. 5, the sealing portion (15) comprises a cylindrical conduit (24) with an isosceles triangular cross-section. The conduit (24) is open on the side of the storage tank and communicates with it. Said conduit (24) receives, in a sliding manner, a float (25) equipped with a magnet (26) at the upper part. Said magnet (26) is intended to be positioned to the right of the third magnetic switch (13) of the first part (1) when the first part (1) is coupled to the second part (2). In practice, the float (25) slides within the cylindrical conduit (24) as a function of the level of the liquid within the tank, and is pushed in the direction of the magnetic switch (13) in order to ensure that, when the volume of liquid within the tank exceeds a certain threshold, the magnet is at a detection distance of the magnetic switch (13) which closes in order to indicate that it is too full.

The invention claimed is:

1. An airtight connection device adapted to receive at least one product from at least one product discharge pipe and transmit the at least one product to a storage tank, the device comprising:

a first part comprising at least one coupling for connecting to the at least one product discharge pipe in an airtight manner, the first part being adapted to receive the at least one product;

a second part that is coupled to the first part in an airtight manner and comprises a coupling adapted to mount the device to the storage tank in an airtight manner, the second part being adapted to: (i) receive the at least one product from the first part and (ii) discharge the at least one product to the storage tank; and a position sensor that: (i) is adapted to activate during the airtight coupling of the second part to the storage tank and (ii) comprises a detection member adapted to detect an activation member that is mounted on a leaf spring mounted to the second part, wherein:

the leaf spring is configured to be compressed when the second part is coupled to the storage tank, the leaf spring includes an annular portion and a blade extending from the annular portion, and the blade has a free end including the activation member.

2. The connection device according to claim 1, wherein the position sensor is associated with the coupling of the first part to the second part.

3. The connection device according to claim 1, wherein:

the detection member is arranged on the first part and the activation member is arranged on the second part, and when the second part is coupled to the storage tank, the activation member is configured to enter a detection field of the detection member.

4. The connection device according to claim 1, wherein:

the second part further comprises a sealing portion adapted to be moved during the airtight coupling of the second part to the storage tank, and the sealing portion comprises an annular shoulder adapted to butt against the annular portion of the leaf spring.

5. The connection device according to claim 1, wherein the activation member comprises at least one magnet.

6. The connection device according to claim 5, wherein the detection member comprises at least one magnetic switch.

7. An apparatus comprising the connection device according to claim 1.

8. The apparatus according to claim 7, further a comprising the storage tank coupled in an airtight manner to the second part.

9. The apparatus according to claim 7, further comprising a processing unit suitable for processing the at least one product discharged to the storage tank.

10. The apparatus according to claim 7, wherein the storage tank comprises a threaded neck adapted to engage the coupling of the second part.

* * * * *